US008457926B2

(12) United States Patent
Shitara et al.

(10) Patent No.: US 8,457,926 B2
(45) Date of Patent: Jun. 4, 2013

(54) DISK PROTRUSION DETECTION/FLATNESS MEASUREMENT CIRCUIT AND DISK GLIDE TESTER

(75) Inventors: Kenichi Shitara, Kamisato (JP); Yasuhiro Tokumaru, Hiratsuka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 321 days.

(21) Appl. No.: 12/841,599

(22) Filed: Jul. 22, 2010

(65) Prior Publication Data
US 2011/0051580 A1 Mar. 3, 2011

(30) Foreign Application Priority Data

Aug. 31, 2009 (JP) ................. 2009-199592

(51) Int. Cl.
*G01B 5/20* (2006.01)
*G01B 21/20* (2006.01)
*G06F 19/00* (2011.01)
*G06F 17/40* (2006.01)

(52) U.S. Cl.
USPC ............. 702/167; 33/533; 33/553; 73/105; 73/865.8; 702/35; 702/82; 702/189; 702/199; 708/200; 708/202; 708/207

(58) Field of Classification Search
USPC ............. 33/533, 549, 551, 553; 73/104, 105, 73/865.8; 356/237.1, 237.2, 237.3, 600; 702/1, 702/81, 82, 127, 155, 167, 168, 187, 189, 702/199; 708/100, 105, 200, 202, 207

IPC ..... G01B 5/00, 5/20, 21/00, 21/20; G06F 11/00, G06F 11/30, 11/32, 17/00, 17/40, 19/00
See application file for complete search history.

(56) References Cited

U.S. PATENT DOCUMENTS

| 2,474,015 | A | * | 6/1949 | Shaw ............................. 73/105 |
| 3,112,642 | A | * | 12/1963 | Harmon et al. ................ 73/105 |
| 3,123,999 | A | * | 3/1964 | Judd .............................. 73/105 |
| 3,254,530 | A | * | 6/1966 | Ohringer ........................ 73/105 |
| 3,720,818 | A | * | 3/1973 | Spragg et al. ................ 702/168 |

FOREIGN PATENT DOCUMENTS

| JP | 10010097 | 1/1998 |
| JP | 2007-305286 | 11/2007 |

* cited by examiner

*Primary Examiner* — Edward Cosimano
(74) *Attorney, Agent, or Firm* — Brundidge & Stanger, P.C.

(57) ABSTRACT

The present invention relates to a disk protrusion detection/flatness measurement circuit and a disk glide tester, in which protrusion detection and average value calculation can be performed without switching signal processing circuits of two systems, one for the protrusion detection of a disk and the other for the average value calculation with respect to a track or a sector of the disk. This also makes it possible to reduce the size of the measurement circuit. In the protrusion detection/flatness measurement circuit, a signal from a protrusion detection sensor is amplified and converted from an analog signal to a digital signal. The signal passes through a band-pass filter to obtain a digital signal with a predetermined bandwidth. Then, peak detection and average value calculation processes are applied in parallel to the obtained digital signal. Thus, pass/fail decision of the disk can be made based on the detected peak and average values.

4 Claims, 1 Drawing Sheet

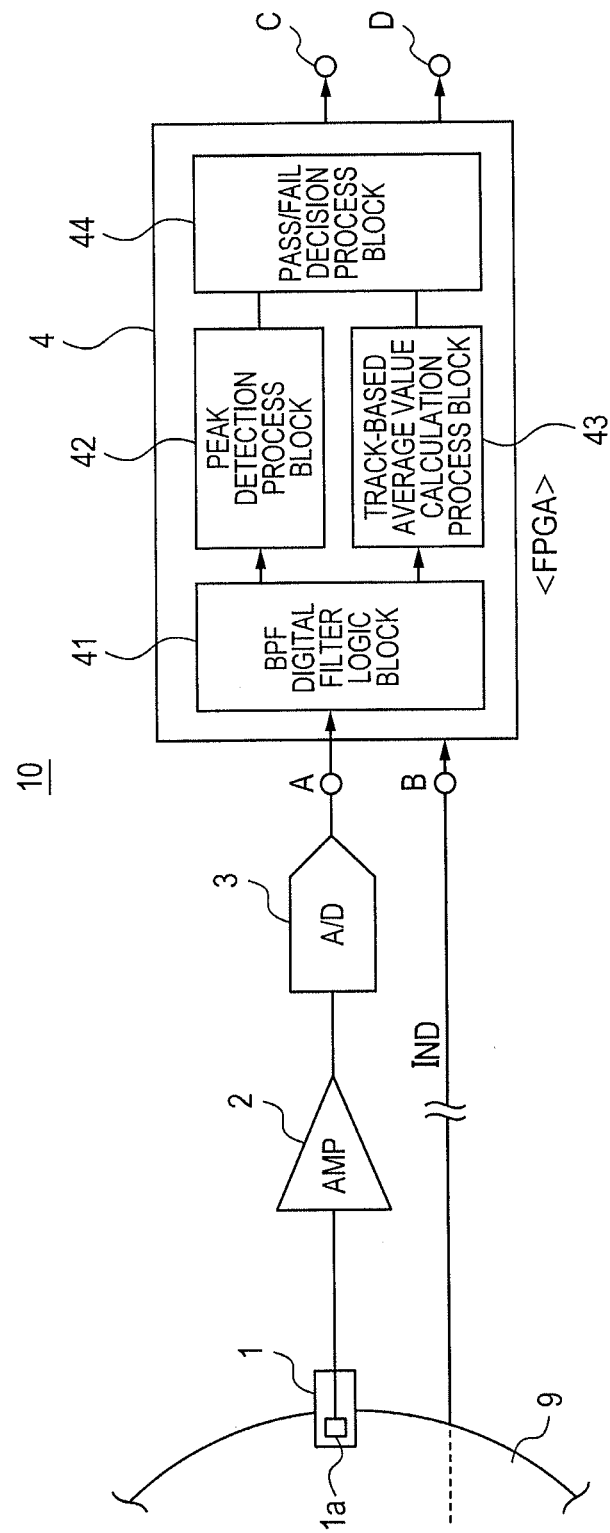

DISK PROTRUSION DETECTION/FLATNESS MEASUREMENT CIRCUIT AND DISK GLIDE TESTER

FIELD OF THE INVENTION

The present invention relates to a disk protrusion detection/flatness measurement circuit and a disk glide tester. More particularly, the invention relates to an improvement in which a disk protrusion detection/flatness measurement circuit can perform protrusion detection and average value calculation without switching signal processing circuits of two systems, one for the protrusion detection of a disk and the other for the average value calculation with respect to a track or a sector of the disk. This also makes it possible to reduce the size of the measurement circuit.

BACKGROUND OF THE INVENTION

In recent years, there has been a growing demand for a higher recording density of a disk used as an information recording medium for computers or other electronic equipment, while the disk has been reduced to a smaller size.

A hard disk is one of the information recording media, which is formed by applying a magnetic film to a surface of a glass substrate or aluminum substrate as a base. The magnetic film should have a flat and smooth surface without concave and convex portions. Thus, the surface of the magnetic disk (hereinafter simply referred to as the disk) is polished and flattened in the varnishing process. However, protrusions may remain even after the surface has been flattened in the varnishing process. For this reason, the disk is tested by a protrusion testing device to check if there is a remaining protrusion on the surface of the disk. When a remaining protrusion is found, the disk is returned to the varnishing process and is polished again.

The protrusion testing device includes a piezoelectric sensor (piezoelectric element) as a protrusion detection sensor on the upper side of a slider of a thin film head. The protrusion testing device is designed to test the presence of a protrusion on a disk in the following way. The disk is rotated at a predetermined circumferential speed. A predetermined flying height is given to the slider (in which the thin film header may be or may not be provided). Then, the vibration generated when the slider collides with a protrusion on the disk is converted to an electrical signal by the protrusion detection sensor. In this way, a protrusion detection signal is obtained. In particular, the present applicants have already applied for a patent on a protrusion testing device for testing surface irregularity on a disk, in addition to testing protrusions as described above (JP-A No. 305286/2007).

It is to be noted that an ultrasonic sensor may be used for the protrusion detection sensor in place of the piezoelectric element.

In the currently used high density recording disk with 10000 or more tracks/inch$^2$, the distance between the magnetic head and the disk is reduced from several tens of nm to several nm. Hence, the flatness of the disk surface has been emphasized in recent years.

When the distance between the magnetic head and the disk is reduced from several tens of nm to several nm, the height of a protrusion to be detected is also reduced to several tens of nm or less. Further, not only the protrusion of the disk but also the surface deflection and flatness of the rotating disk are a problem in the detection of such a protrusion height.

The surface deflection is caused by the irregularity of the surface of the disk, and by the degradation of the balance due to the eccentricity of the disk with respect to the axis of rotation. In particular, in the recent glass disk with a thickness from 0.3 mm to 0.5 mm, surface deflection is likely to occur due to the irregularity of the surface of the disk when it is rotated.

As described above, when the distance between the magnetic head and the disk becomes small, the surface deflection of the disk increases, or the flatness of the disk is degraded. This will cause an error in writing and reading, or lead to a head crash. As a result, even if a protrusion with a considerable height is not present on a disk, the disk is typically determined to be failed.

Thus, a measurement circuit for obtaining a signal of an average value of the track and the like is added to a protrusion detection circuit of the protrusion testing device as disclosed in JP-A No. 305286/2007, in order to measure the flatness of the disk.

The measurement circuit for obtaining average value signals can obtain signals relating to the flatness in the following way. A signal of about 100 kHz to 500 kHz is obtained by a piezoelectric sensor through air vibration generated by the disk rotation. The obtained signal shows the concave-convex state of the disk surface. Such a signal can be obtained by the piezoelectric sensor mounted on the upper portion of a slider of 5 mm square or less.

The currently used protrusion testing device measures the flatness of a disk in the following way. A protrusion detection circuit detects the peak of a signal from the piezoelectric element. An average value calculation circuit disposed parallel to the protrusion detection circuit detects the average value of the signal from the piezoelectric element, to calculate the average value for each track. The average value is converted from an analog signal to a digital signal. Then, the average value for each track is compared with a predetermined reference value in a data processing device. When the obtained average value does not exceed the predetermined reference value, it is determined that the flatness of the disk is within the specifications.

However, when such an average value calculation circuit is disposed parallel to the protrusion detection circuit, data should be processed by converting from an analog signal to a digital signal. For this reason, it is necessary to have a circuit for switching between the protrusion detection circuit and the average value calculation circuit. This leads to a problem that the disk test efficiency is reduced.

Parallel processing of data is possible by providing an A/D conversion circuit both in the protrusion detection circuit and in the average value calculation circuit. However, a D/A conversion circuit of 16 bits or more is necessary to ensure the measurement accuracy. This leads to an increase in size of the measurement circuit.

SUMMARY OF THE INVENTION

An object of the present invention is to solve the problems of the related art described above. An aspect of the present invention is to provide a disk protrusion detection/flatness measurement circuit capable of performing protrusion detection and average value calculation, without switching between signal processing circuits of two systems, one for the protrusion detection of a disk and the other for the average value calculation with respect to a track or a sector of the disk. This also makes it possible to reduce the size of the measurement circuit.

Another aspect of the present invention is to provide a disk glide tester capable of performing protrusion detection and average value calculation, without switching between signal processing circuits of two systems, one for the protrusion detection of a disk and the other for the average value calculation with respect to a track or a sector of the disk. This also makes it possible to improve the test efficiency of the disk.

To achieve the above aspects, the present invention provides a disk protrusion detection/flatness measurement circuit including a protrusion detection sensor, an amplifier circuit, an A/D conversion circuit, and a data processing circuit. The amplifier circuit amplifies a signal from the protrusion detection sensor. Then, the A/D conversion circuit converts a detection signal amplified by the amplifier circuit from an analog signal to a digital signal. The data processing circuit applies a band-pass filter process to the signal received from the A/D conversion circuit, to obtain a digital signal with a predetermined bandwidth. Then, the data processing circuit performs a peak detection process to detect a peak value based on the digital signal of the particular bandwidth. Then, the data processing circuit performs an average value calculation process to calculate an average value with respect to a track or a sector of a disk.

According to the present invention, the signal from the protrusion detection sensor is amplified and converted from an analog signal to a digital signal. Then, a digital value is obtained through a digital band-pass filter (BPF). Then, the peak detection process and the average value calculation process are applied in parallel to the digital value. A pass/fail decision of the disk can be made based on the peak value detected by the peak detection process and based on the average value detected by the average value calculation process.

In the present invention, the band-pass filter (BPF) process is performed within the data processing circuit. Thus, there is no need to provide an external analog filter processing circuit, and no need to have a switching circuit for switching between the protrusion detection circuit and the average value calculation circuit.

As a result, it is possible to perform the protrusion detection and the average value calculation without providing a switching circuit for switching the signal processing circuits of two systems, one for the protrusion detection of a disk and the other for the average value calculation with respect to a track or a sector of the disk. In addition, it is also possible to reduce the size of the measurement circuit, and to improve the test efficiency of the glide tester of the disk.

BRIEF DESCRIPTION OF THE DRAWING

The FIGURE is a block diagram of a protrusion detection/flatness measurement circuit in a disk test according to one exemplary embodiment, to which a disk protrusion detection/flatness measurement circuit according to the present invention is applied.

DETAILED DESCRIPTION OF THE PREFERRED EMBODIMENT

In the FIGURE, reference numeral 10 denotes a protrusion detection/flatness measurement circuit of a disk. Reference numeral 1 denotes a magnetic head. Reference numeral 1a denotes a piezoelectric sensor (piezoelectric element). Reference numeral 2 denotes an amplifier (AMP). Reference numeral 3 denotes an A/D conversion circuit (A/D). Reference numeral 4 denotes a field programmable logic array (FPGA). Reference numeral 9 denotes a rotating disk to be tested.

The internal circuitry of the FPGA 4 includes a BPF digital filter logic block 41, a peak detection process block 42, a track average value calculation process block 43, and a pass/fail decision process block 44. These blocks are programmed into writable memory and provided together with a logic circuit in the FPGA 4. Then, an index signal IND is input from an encoder provided on the side of a spindle for rotating the disk to the FPGA 4 through an input port B of the FPGA 4.

An input signal of the piezoelectric sensor 1 is amplified by the amplifier 2. Then, an analog voltage signal of protrusion detection of the piezoelectric sensor 1 is converted to a digital value by the A/D 3. Then, the digital data is serially input to a signal input port A of the FPGA 4.

In the FPGA 4, the digital value of the protrusion detection signal of the piezoelectric sensor 1a is filtered by the BPF digital filter logic block 41. Then, the filtered data with a predetermined bandwidth is transmitted both to the peak detection process block 42 and to the track-based average value calculation process block 43.

The processing bandwidth of the BPF digital filter logic block 41 is extracted by selecting a signal with a frequency bandwidth plus or minus 150 kHz, or less than plus or minus 150 kHz, from one of the frequencies in the range of 250 Hz to 3 MHz as the central frequency.

It is to be noted that the filtering process may also be performed using the central frequencies of the two systems on the side of the protrusion detection (the peak detection process block 42), and on the side of the average value calculation (the track average value calculation process block 43). In this case, for example, the protrusion detection side is set to a high frequency to select a signal from the frequency range of 1 MHz to 3 MHz, and the average value calculation side is set to a low frequency to select a signal from the frequency range of 250 kHz to 1 MHz.

The peak detection process block 42 forms a maximum voltage holding circuit (peak holding circuit). The maximum peak voltage value (digital value) of one track is held in the maximum voltage holding circuit in response to the index signal IND. Then, the maximum peak voltage value is stored in a memory area of the FPGA 4.

The track-based average value calculation process block 43 calculates the average value of one track of the protrusion detection signal of the piezoelectric sensor 1a, by a digital process in response to the index signal IND. Then, the calculated average value is stored in the memory area of the FPGA 4.

It is to be noted that the memory area has enough space to store the track-based peak voltage value and the track-based average value for all the tracks.

The pass/fail decision process block 44 for all stored tracks compares the maximum peak voltage value of each track stored in the memory area of the FPGA 4 with a predetermined threshold (reference value) corresponding to the peak stored in advance in a parameter storage area of the FPGA 4 at the time when the peak voltage value is detected in the particular track. The pass/fail decision process block 44 sequentially compares the peak voltage values of the stored tracks. When there is a track exceeding the predetermined threshold, the pass/fail decision process block 44 determines that the tested disk 9 is failed (NG), and outputs an NG signal from an output port C.

Otherwise, the memory pass/fail decision process block 44 for all stored tracks proceeds to an average value determination process of the protrusion detection signal of the voltage value for one track. Then, the pass/fail decision process block 44 compares the average value for each track stored in the memory area of the FPGA 4 with a predetermined threshold (reference value) corresponding to the average value stored in advance in the parameter storage area of the FPGA 4 at the time when the average value of the particular track is detected.

When the average value of the protrusion detection signal in a track exceeds the predetermined threshold, the pass/fail decision process block 44 also outputs an NG signal from the output port C.

It is to be noted that the pass/fail decision process block 44 for all stored tracks may be programmed or arranged so that the determination process of the average value of the protrusion detection signal is performed simultaneously to the comparison determination of the peak voltage value in a parallel process (or a task process).

Here, when a track is determined to be failed (NG) in the average value, a retry process may be applied to determine again if the track is failed (NG). In this case, when the track is failed (NG) in all given retries, it is determined that the track is failed. On the other hand, when the track is not failed (NG) in the retry process, it is determined that the track is successful (GD). Then, the pass/fail decision process block 44 proceeds to the average value determination process of the next track.

When both the peak voltage values and the average values for all the tracks are successful (GD), the disk 9 is determined to be successful. Then, a GD signal is output from the output port C.

In the above description, the peak voltage value and the average value are calculated for each track. It is also possible, however, that the peak voltage value and the average value are calculated for each sector by generating a sector signal within the FPGA 4 in response to the index signal IND. Then, the peak voltage value and the average value for each sector are compared with a predetermined threshold (reference value) corresponding to the particular sector, respectively, to make a pass/fail decision of the disk 9.

When the disk is determined to be successful (GD), the pass/fail decision process block 44 calculates the average value for the whole disk. Then, the pass/fail decision process block 44 statistically processes data on the difference of the average values of the protrusion detection signals for the respective tracks. Then, the pass/fail decision process block 44 calculates the flatness data to be displayed, and outputs the data from the output port D to the outside.

It is to be noted that even when the disk has been determined to be failed (NG), the pass/fail decision process block 44 may perform the protrusion detection and the average value calculation for all the tracks to obtain data to be displayed, and output the data from the output port C to the outside.

Here, it is determined that the flatness of the disk is within the specifications when the average value, which is obtained from the detection signal of the protrusion detection sensor for each track or each sector, is equal to or less than a predetermined reference value.

As described above, in the embodiment, the BPF digital filter logic block 41 is a BPF whose bandwidth is in the range of 250 kHz to 3 MHz frequencies. Further, it is possible to add a low-pass BPF for separating a bandwidth of 500 kHz or less, for example, a bandwidth in the range of 250 kHz±50 kHz, to calculate the average value of the protrusion detection signal for each track. In this case, the irregularity state can be measured in a similar way to the technology disclosed in JP-A No. 30528/2007, allowing for a pass/fail decision by comparing the irregularity state with a predetermined threshold (reference value).

According to this embodiment, the BPF digital filter process, the peak detection process, the track-based average value calculation process, and the pass/fail decision process are performed in the data processing circuit of the FPGA. However, these processes are not necessarily performed in the FPGA. It goes without saying that the respective process blocks may be realized by a program process in a data processing device such as a system LSI having an MPU.

What is claimed is:

1. A disk protrusion detection/flatness measurement circuit comprising:
    a protrusion detection sensor;
    an amplifier circuit for amplifying a signal from the protrusion detection sensor;
    an A/D conversion circuit for converting a detection signal amplified by the amplifier circuit, from an analog signal to a digital signal; and
    a data processing circuit comprising:
    a band-pass filter block for filtering a digital signal received from the A/D conversion circuit with at least a predetermined bandwidth;
    a peak detection process block for detecting a peak value based on the signal received from the band-pass filter block and providing an output based on the detected peak value and representing a disk protrusion measurement; and
    an average value calculation process block for calculating an average value of the signal received from the band-pass filter block within a track or a sector of a disk and providing an output based on the calculated average value and representing a flatness measurement.

2. The disk protrusion detection/flatness measurement circuit according to claim 1, wherein the data processing circuit is made up by an FPGA, further comprising a pass/fail decision process block for deciding a pass/fail of the disk based on the peak value and the average value.

3. A disk glide tester comprising:
    a disk protrusion detection/flatness measurement circuit, including:
    a protrusion detection sensor;
    an amplifier circuit for amplifying a signal from the protrusion detection sensor;
    an A/D conversion circuit for converting a detection signal amplified by the amplifier circuit, from an analog signal to a digital signal; and
    a data processing circuit comprising:
    a band-pass filter block for filtering a digital signal received from the A/D conversion circuit with at least a predetermined bandwidth;
    a peak detection process block for detecting a peak value based on the signal received from the band-pass filter block and providing an output based on the detected peak value and representing a disk protrusion measurement; and
    an average value calculation process block for calculating an average value of the signal received from the band-pass filter block within a track or a sector of a disk and providing an output based on the calculated average value and representing a flatness measurement.

4. The disk glide tester according to claim 3, wherein the data processing circuit is made up by an FPGA, further comprising a pass/fail decision process block for deciding a pass/fail of the disk based on the peak value and the average value.

* * * * *